(12) United States Patent
Yoneyama

(10) Patent No.: US 7,756,357 B2
(45) Date of Patent: Jul. 13, 2010

(54) MICROSCOPE SYSTEM FOR OBTAINING HIGH AND LOW MAGNIFICATION IMAGES

(75) Inventor: Takashi Yoneyama, Sagamihara (JP)

(73) Assignee: Olympus Corporation, Tokyo (JP)

(*) Notice: Subject to any disclaimer, the term of this patent is extended or adjusted under 35 U.S.C. 154(b) by 554 days.

(21) Appl. No.: 10/871,817

(22) Filed: Jun. 17, 2004

(65) Prior Publication Data
US 2005/0002587 A1 Jan. 6, 2005

(30) Foreign Application Priority Data
Jul. 1, 2003 (JP) .............................. 2003-270221

(51) Int. Cl.
G06K 9/40 (2006.01)
G06K 9/36 (2006.01)
G02B 23/00 (2006.01)

(52) U.S. Cl. ...................... 382/280; 382/154; 382/284; 359/368

(58) Field of Classification Search ................. 359/368, 359/363, 383, 380; 250/201.3–201.5; 382/276, 382/154, 280, 284
See application file for complete search history.

(56) References Cited

U.S. PATENT DOCUMENTS

| | | | | |
|---|---|---|---|---|
| 5,124,842 A | * | 6/1992 | Honda et al. ................ 359/561 |
| 5,148,502 A | * | 9/1992 | Tsujiuchi et al. ............ 382/255 |
| 5,276,550 A | * | 1/1994 | Kojima ....................... 359/368 |
| 5,933,513 A | | 8/1999 | Yoneyama et al. |
| 6,272,235 B1 | * | 8/2001 | Bacus et al. ................. 382/133 |
| 6,300,618 B1 | * | 10/2001 | Tanaami et al. ............. 250/216 |
| 6,711,283 B1 | * | 3/2004 | Soenksen ..................... 382/133 |
| 7,027,628 B1 | * | 4/2006 | Gagnon et al. .............. 382/128 |
| 2003/0227673 A1 | * | 12/2003 | Nakagawa .................. 359/380 |
| 2004/0004614 A1 | * | 1/2004 | Bacus et al. ................ 345/419 |

FOREIGN PATENT DOCUMENTS

| | | |
|---|---|---|
| JP | 5-333271 A | 12/1993 |
| JP | 9-281405 A | 10/1997 |
| JP | 9-298682 A | 11/1997 |
| JP | 3191928 B2 | 5/2001 |
| JP | 2002-258163 A | 9/2002 |

* cited by examiner

Primary Examiner—Alessandro Amari
Assistant Examiner—Mark Consilvio
(74) Attorney, Agent, or Firm—Frishauf, Holtz, Goodman & Chick, P.C.

(57) ABSTRACT

A host system defines a plurality of partial areas for a observation object which is a sample, obtains a partial image of an observation object in the partial area captured using a TV camera at the interval of the depth of focus of an objective lens in the depth-of-focus direction of the objective lens, generates from the partial images a focused partial image in which an object contained in the partial area is represented in a focusing state regardless of the difference in a position in the depth-of-focus direction, and generates and displays a focused image of an observation object by combining focused partial images generated in the respective partial area.

16 Claims, 15 Drawing Sheets

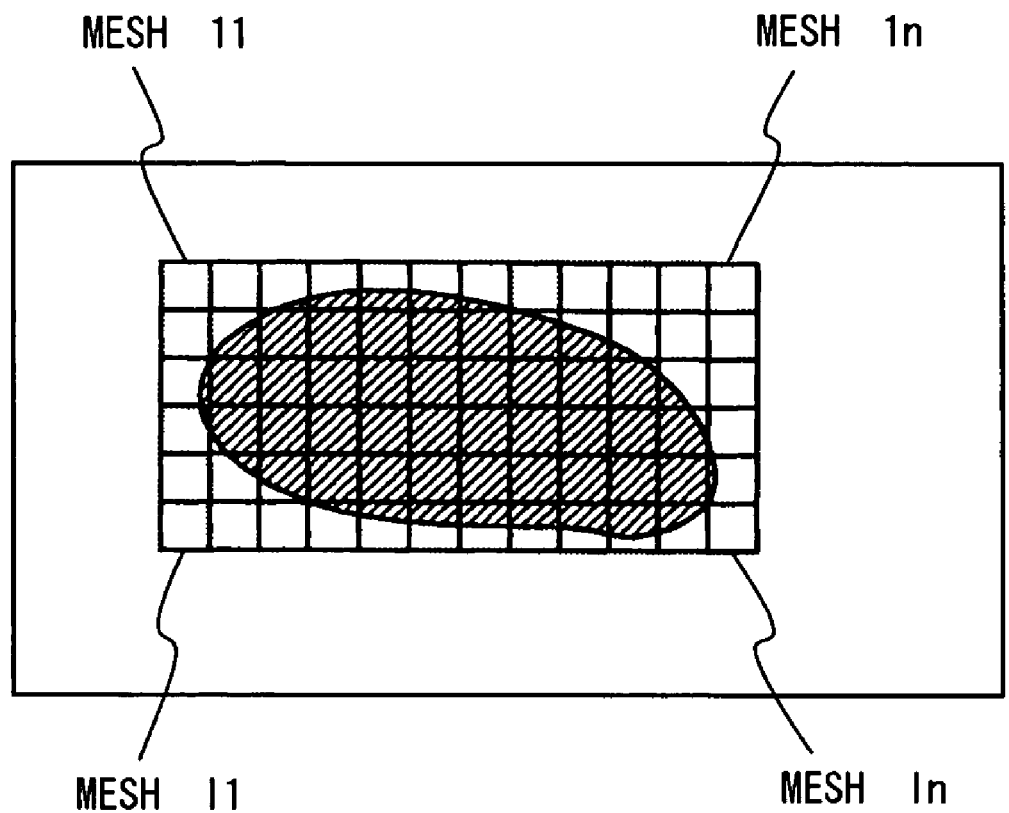
F I G. 4

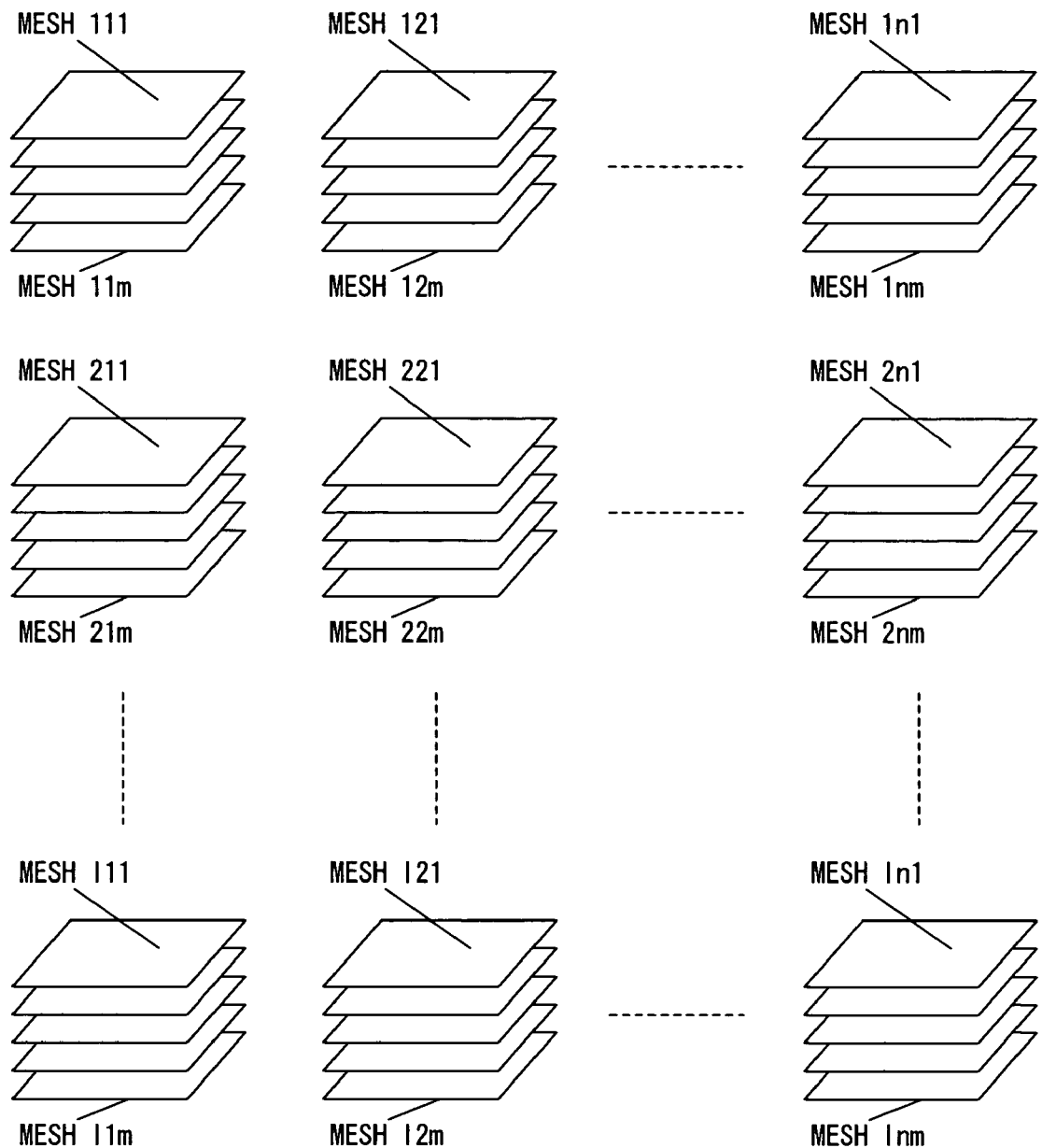
F I G. 6

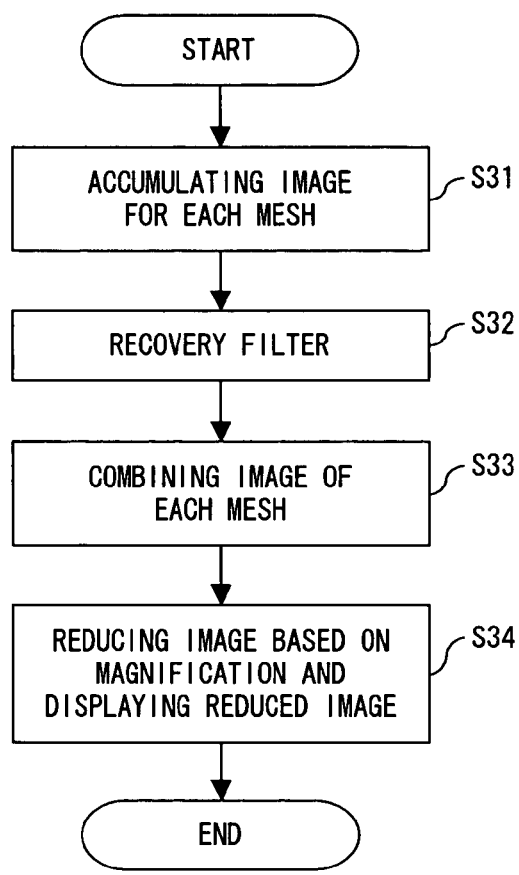
F I G. 7A
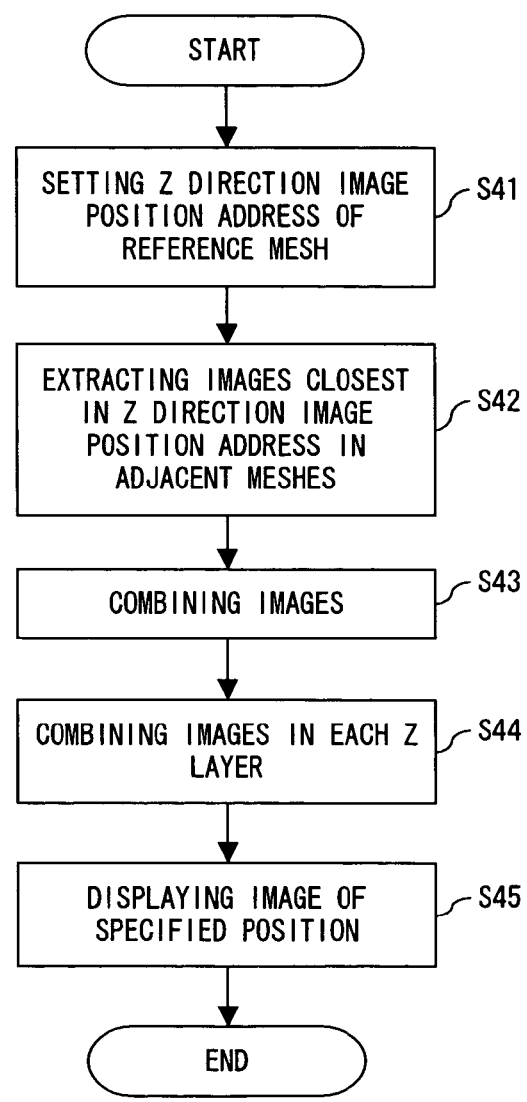
F I G. 7B

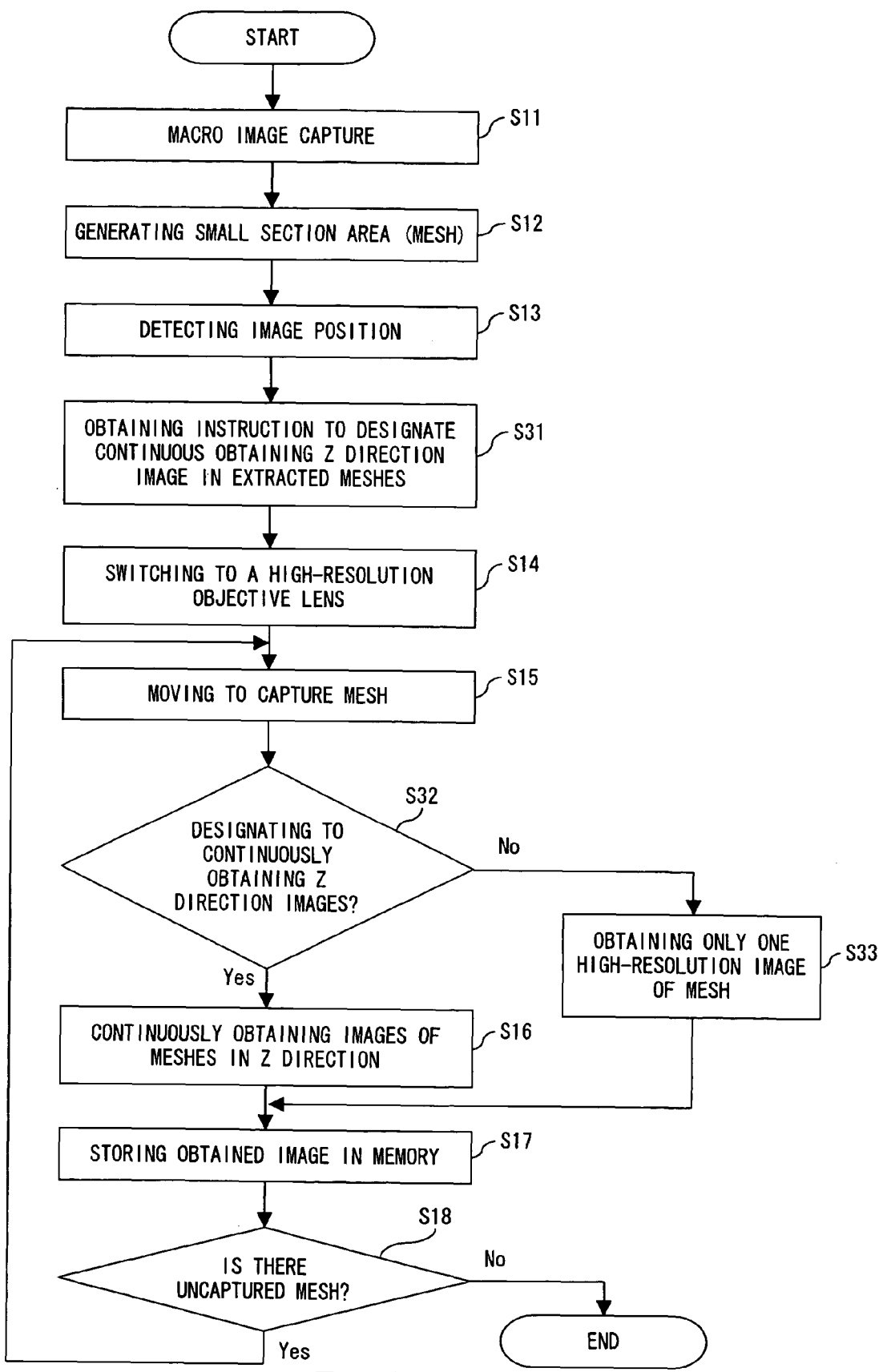
F I G. 10

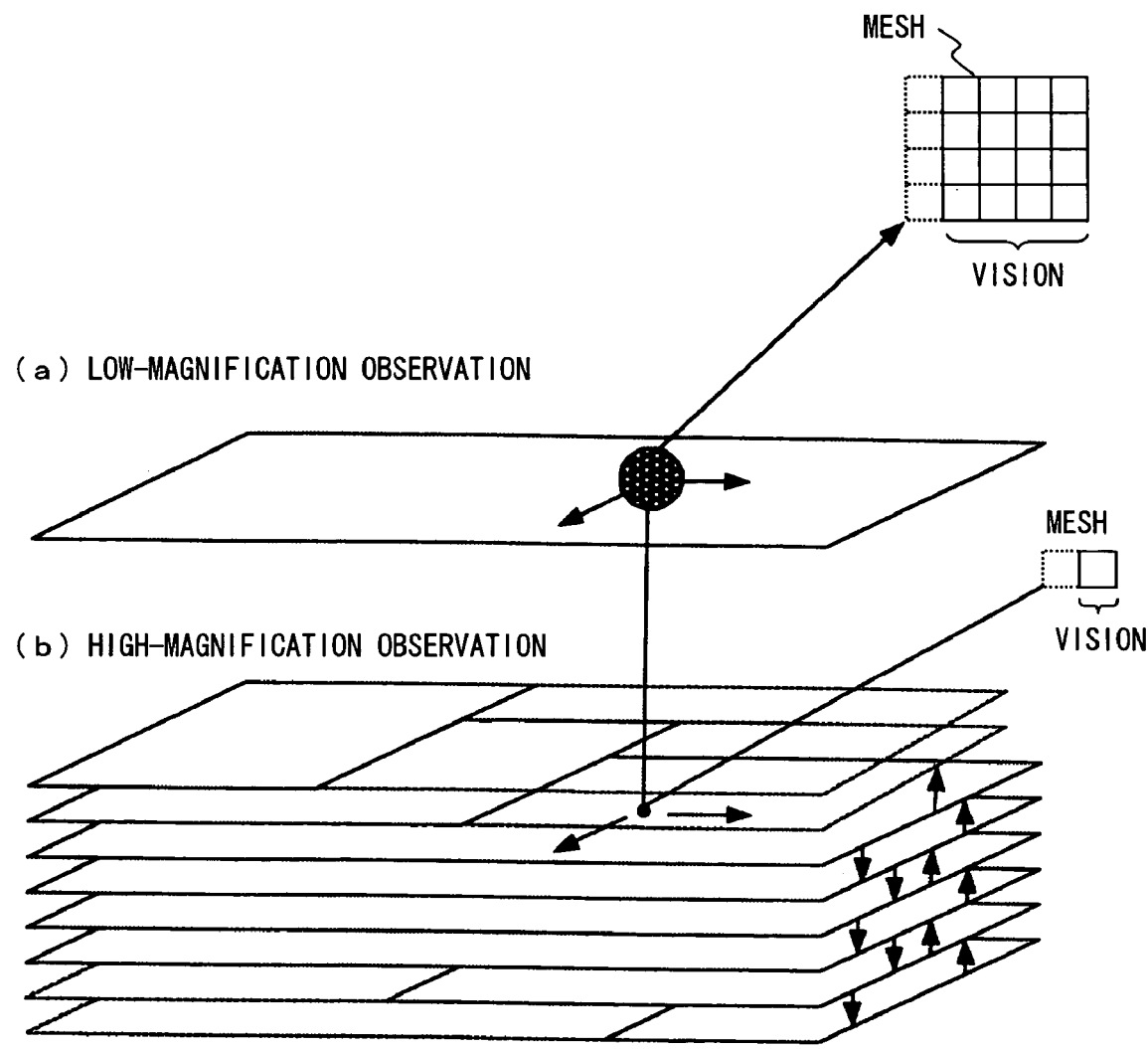
F I G. 1 3

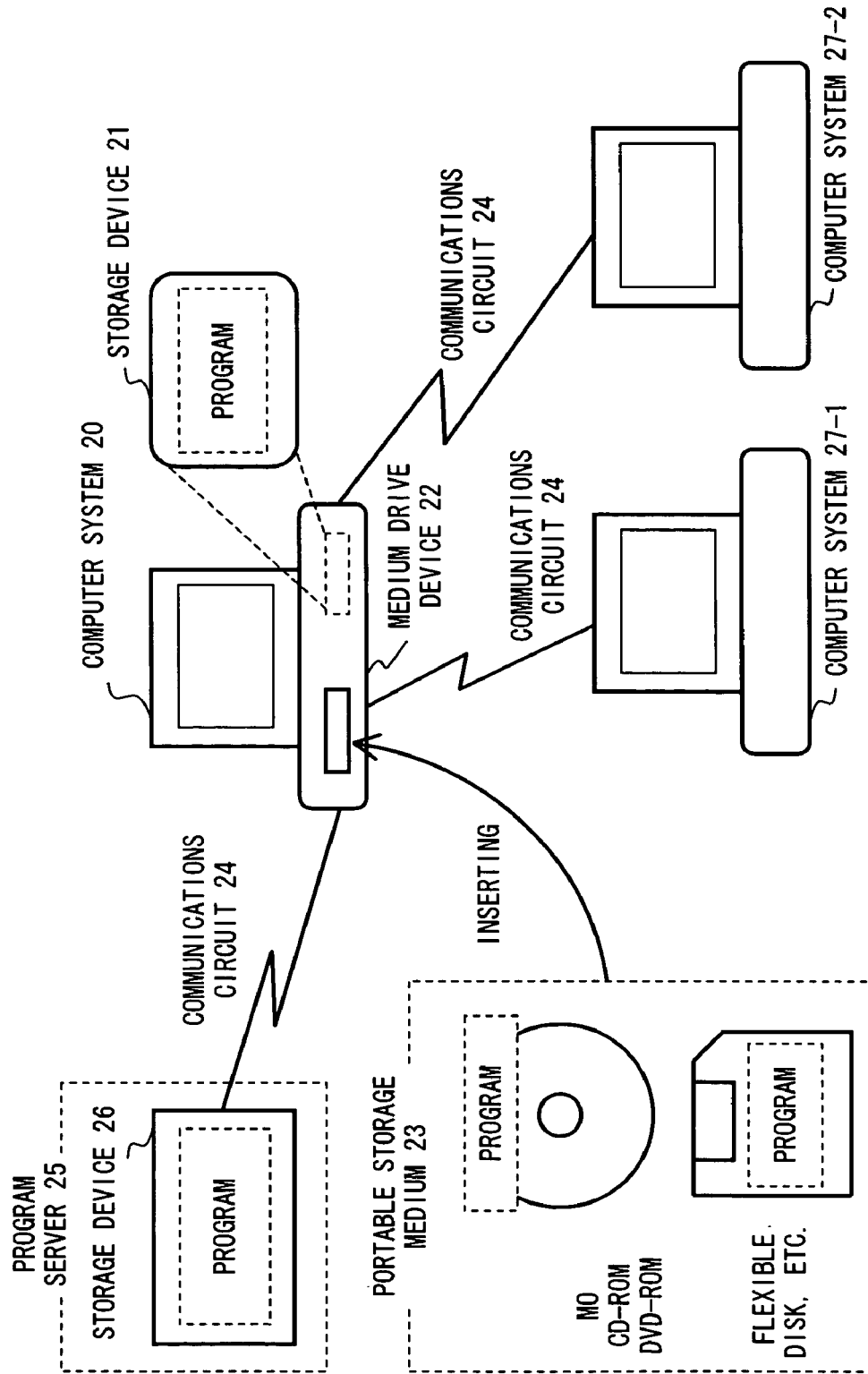
F I G. 15

MICROSCOPE SYSTEM FOR OBTAINING HIGH AND LOW MAGNIFICATION IMAGES

CROSS REFERENCE TO RELATED APPLICATION

This application claims benefit of Japanese Application No. 2003-270221, filed Jul. 1, 2003, the contents of which are incorporated by this reference.

U.S. Pat. No. 5,933,513 is hereby incorporated by reference.

BACKGROUND OF THE INVENTION

1. Field of the Invention

The present invention relates to a microscope system which displays a high-resolution image of a wide angle of view.

2. Description of the Related Art

The need for computerization is growing rapidly also in the field of pathological diagnostics by microscopic observation.

For example, Japanese Patent Application Laid-open No. Hei 9-281405 has disclosed a virtual microscope system for reconstructing an image of an observation object by first dividing an entire observation object into small areas, capturing the divided areas using a high-resolution objective lens, and then combining the images obtained by the capturing operations.

In this system, a microscopic observation can be performed on an observation object without having an observation object at a spot so that the following observation (virtual microscopic observation) can be realized by image processing as well as an observation of an observation object actually at the spot.

1. Switch from Low-magnification Observation to High-Magnification Observation

In performing a low-magnification observation, an image of a wide angle of view can be displayed under reduction by combining a number of divided images while each of the divided images can be displayed as is in a high-magnification observation.

2. In an X-Y Operation to Observation Object

In an X-Y operation by a diagnostician, that is, in an operation of a diagnostician with an observation object traversed in a direction perpendicular to the optical path of a microscope, an observation object image is traversed in an X-Y movement by changing the display range of a reconstructed image.

In the system using the above-mentioned technology, an observation object can be diagnosed without restrictions of time. With the image data of an observation object image shared, a plurality of diagnosticians can simultaneously observe the same observation object in the respective locations. In addition, a diagnostician can make an observation anywhere.

When an observation is performed in the X-Y operation using a real observation object, the possible out-of-focus state due to the inclination, etc. of the object normally has to be corrected. However, in this system, an object can be observed constantly in an in-focus state. Therefore, a diagnosis can be carried out with high reliability and efficiency.

Additionally, in the field of training of pathological diagnosticians using a real observation object, the same observation objects are to be prepared for the pathological diagnosticians. However, in the present system, the same observation object images can be used in the training by taking advantage of sharing image data of an observation object image.

Furthermore, using a preparation containing a real observation object, the same samples cannot be prepared in the same state when the observation object becomes faded of damaged. However, using an observation object image represented by electronic data, backup data can be used in observations in the same state anytime and anywhere.

As described above, the microscope system disclosed by Japanese Patent Application Laid-open No. Hei 9-281405 enables an efficient observation to be realized in a microscopic observation on a real observation object with high precision and reliability.

A similar technology is also disclosed by, for example, Japanese Patent Application Laid-open No. Hei 5-333271.

For another example, Japanese Patent Application Laid-open No. 2002-258163 has disclosed a remote microscopic observation system for determining a traverse pitch of a focal position in obtaining a microscopic image in a plurality of focal positions based on the optical wavelength used in a sample observation and the numerical aperture of an objective lens used in a sample observation, storing in an image database the microscopic image obtained with the focal position moved based on the determined traverse pitch, and distributing and displaying the microscopic image at a request from each of a plurality of personal computers.

Japanese Patent Application Laid-open No. Hei 9-298682 (U.S. Pat. No. 5,933,513) discloses the technology of a depth of focus extension apparatus capable of obtaining at a lower cost an image of a long depth of focus and constantly excellent in resolution and brightness in optically variable conditions of the numerical aperture, the available wavelength of an image pickup device, etc. of an image forming optical system, based on the technology (refer to, for example, Japanese Patent Publication No. 3191928) of recovering an image of an object in different locations in the optical axis direction by performing a recovery process using a spatial frequency filter referred as a recovery filter on a summed image obtained by adding up a plurality of images including an image in an in-focus state of an object in different locations in the optical axis direction.

In the conventional virtual microscope system, there is the problem that the information in the Z direction, that is, in the optical axis direction of a microscope, can be lost due to the thickness of an observation object.

FIG. 1 shows an example of the relationship between an observation object and the depth of focus of an objective lens. When there are two cells A and B in an observation object having the thickness of $\alpha$, the object is captured by an objective lens having the depth of focus of $\beta$.

In the status as shown in FIG. 1, the cells A and B cannot be simultaneously captured using the depth of focus of $\beta$, and either the cell A or B cannot appear on the captured image. Additionally, although the cells A and B are located closer to each other in the thickness direction, one of the cells A and B can be set in an in-focus state with the other in an out-of-focus state, thereby obtaining a resultant observation object image with a part of the information lost.

If a real observation object is used in a microscopic observation, the depth of focus can be increased by performing a low-magnification observation using a low magnification objective lens, thereby carrying out the observation with both two cells in the in-focus state.

However, in an observation using the virtual microscope system according to the conventional technology, the observation cannot be performed with both two cells simultaneously in-focus state although the image processing is performed with divided and captured images combined into a reconstructed image in a low-magnification observation.

SUMMARY OF THE INVENTION

The microscope system according to an aspect of the present invention includes: a definition unit defining a plurality of partial areas for an observation object to be observed; a partial image obtaining unit obtaining a plurality of partial images of the observation object in the partial areas at the intervals of the depth of focus of an objective lens in the depth-of-focus direction of the objective lens; a focused partial image generation unit generating a focused partial image in which an object contained in the partial areas is represented in a focusing state regardless of the differences in position in the depth-of-focus direction from the plurality of partial image; and a focused image generation unit generating a focused image of the observation object by combining the focused partial images generated in the respective partial areas.

In the above-mentioned microscope system according to the present invention, the focused partial image generation unit can generate the above-mentioned focused partial image by performing a recovery process by spatial frequency filtering based on a plurality of partial images.

The microscope system according to the present invention can further include an area designation obtaining unit obtaining an instruction of an area to be observed in the observation object, and wherein the definition unit can define the partial areas in areas designated the area designation obtaining unit.

At this time, the system can further include a whole-object image obtaining unit obtaining a whole-object image representing the whole image of the observation object, and wherein the area designation obtaining unit can obtain the designation for the whole-object image.

The microscope system according to another aspect of the present invention includes: a definition unit defining a plurality of partial areas for an observation object to be observed; a partial image obtaining unit obtaining a plurality of partial images of the observation object in the partial areas at the intervals of the depth of focus of an objective lens in the depth-of-focus direction of the objective lens; and a sectional image generation unit generating a plurality of sectional images of the observation object for the respective depth-of-focus positions by combining the partial images obtained in the respective partial areas depending on the depth-of-focus positions of the objective lens when the partial image are obtained.

BRIEF DESCRIPTION OF THE DRAWINGS

The present invention will be more apparent from the following detailed description when the accompanying drawings are referenced.

FIG. 4 shows an example of a macro image for which a mesh is prepared;

FIG. 6 shows the state in which an image captured by performing the processes shown in FIGS. 4 and 5 is stored at the host system;

FIG. 7A is a flowchart showing the contents of the virtual image generating process under low magnification:

FIG. 7B is a flowchart showing the contents of the virtual image generating process under high magnification:

FIG. 10 is a flowchart showing the contents of the process of the second variation of the image obtaining process shown in FIG. 3;

FIG. 13 is an explanatory view of the virtual image display process;

FIG. 15 shows an example of a computer-readable storage medium capable of reading a stored control program.

DESCRIPTION OF THE PREFERRED EMBODIMENTS

Embodiment 1

Figure 1:
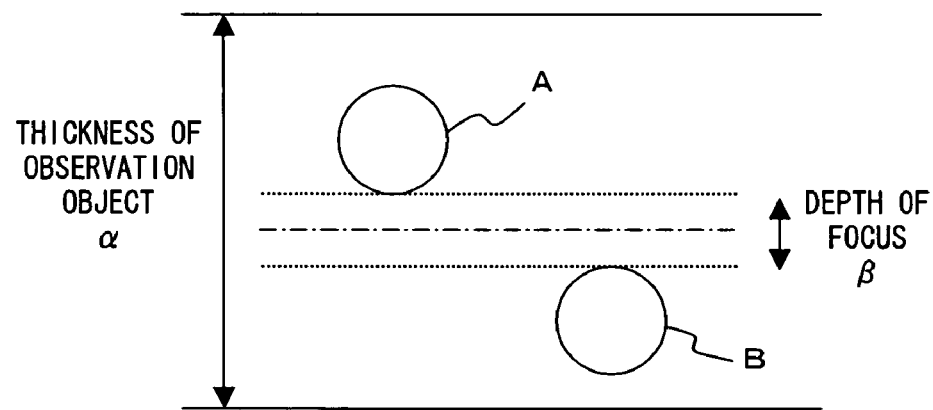
FIG. 1 shows an example of the relationship between an observation object and the depth of focus of an objective lens.
Figure 2:
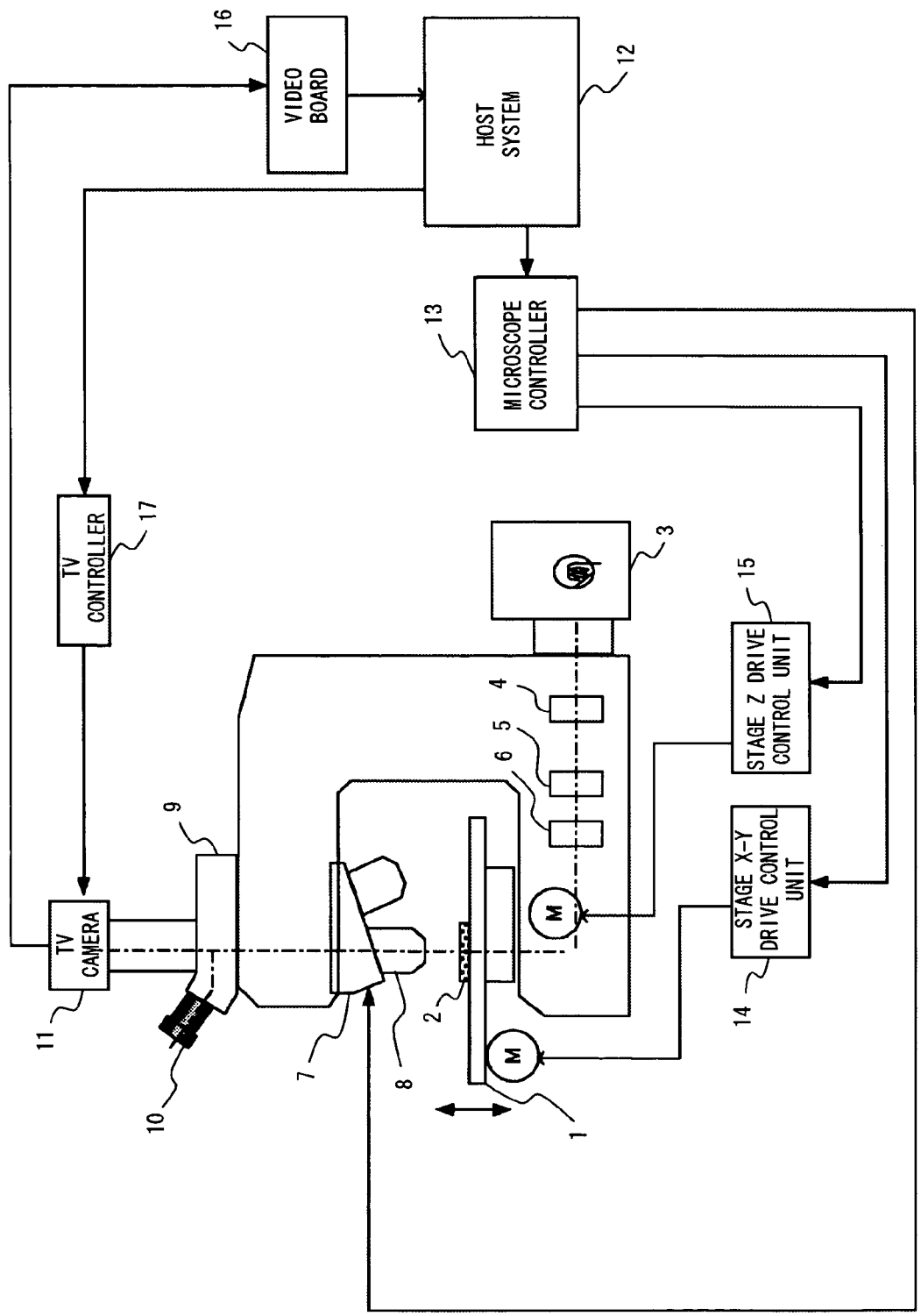
FIG. 2 shows the configuration of the microscope system embodying the present invention.

FIG. 2 shows the configuration of the microscope system embodying the present invention.

In the microscope system shown in FIG. 2, a sample 2, which is an observation object, is loaded with a stage 1 movable in the optical path direction (Z direction) of a microscope and in the direction perpendicular (XY direction) to the optical path. A light source 3 is for transmitted illumination to the sample 2. The illuminating light from the light source 3 is irradiated to the sample 2 through an ND (neutral density) filter 4, a field stop (FS) 5, and an aperture stop (AS) 6.

The luminous flux from the sample 2 passes an objective lens 8 attached to a revolver 7 and reaches a barrel 9. A part of the luminous flux is lead to an eyepiece lens 10, and the remainder is input to a TV (television) camera 11.

The control of the microscope is performed by a host system 12 through a microscope controller 13. The microscope controller 13 allows each electric control unit to issue a control instruction to each control unit for actual drive control.

For the light source 3, the ND filter 4, the FS 5, and the AS 6, the respective control units not shown in the attached drawings are provided in the system. The microscope controller 13 can control these components, and controls; for example, the voltage to be applied to the light source 3, the diaphragm of the FS 5 and the AS 6, etc.

The revolver 7 can perform electric control, and the magnification, etc. of the objective lens 8 in the optical path can be changed by the revolver drive control unit turning the revolver 7 at a control instruction from the microscope controller 13.

Furthermore, the stage 1 can perform electric control on the position in the X, Y, and Z directions, and the control is realized by controlling the operation of the motor M by a stage X-Y drive control unit 14 and a stage Z drive control unit 15.

The image of the sample 2 captured by the TV camera 11 is acquired by the host system 12 after it is converted by a video board 16 into image data which is digital data. The host system 12 can display the obtained image on the display unit not shown in the attached drawings, and can store a plurality of acquired images in image memory. The host system 12 can set the ON/OFF settings of the automatic gain control function of the TV camera 11 and the control gain, and the ON/OFF settings of the automatic exposure control and the exposure time through a TV controller 17.

The host system 12 can be configured by, for example, a standard computer system, that is, a computer system comprising a CPU (central processing unit) for controlling the operation of the host system 12 by executing a control program, main memory for use by the CPU as work memory as necessary, an interface unit for managing the transmission and reception of various data, for example, receiving image data from the video board 16, transmitting control data to the microscope controller 13 and the TV controller 17, etc., an auxiliary storage device such as a hard disk device, etc. for storing various programs, image data, etc., and a display unit for displaying an image represented by image data and various types of information.

The microscope system shown in FIG. 2 is configured as described above.

In the present embodiment, a plurality of partial areas are defined for the sample 2 to be observed, a plurality of partial images which are images of an observation object in the partial area captured by the microscope system are obtained at intervals of the depth of focus in the depth-of-focus direction of the objective lens 8, a focused partial image which is a partial area represented in an in-focus state regardless of the position in the depth-of-focus direction is generated from a plurality of partial images, and a focused image of the observation object is generated and displayed by combining the focused partial images generated for the respective partial areas.

In this embodiment, since a plurality of partial images are obtained at intervals of the depth of focus in the depth-of-focus direction of the objective lens 8, any portion contained in a partial area has an image in an in-focus state in the obtained partial images regardless of the difference in position in the depth-of-focus direction of the objective lens 8. Therefore, the focused partial image of a portion contained in a partial area regardless of the difference in position in the above-mentioned direction can be generated based on the partial images.

That is, a focused partial image in the in-focus state for any portions different in direction in the depth-of-focus direction, that is, an image as if it were taken using the objective lens 8 having a long depth of focus although it is a high magnification lens, can be obtained from a plurality of partial image taken by using the objective lens 8 having a long depth focus and high magnification.

Therefore, a focused image of an observation object generated by combining focused partial images can provide an image of a long depth of focus as a low-magnification observation in the microscopic observation using a real observation object by displaying the focused image under reduction as necessary when low-magnification observation is performed in the virtual microscopic observation.

Described below are various control processes performed by the host system 12 shown in FIG. 2. When the host system 12 is configured using a standard computer system, for example, a control program for allowing the computer system to perform the control process is prepared in advance and stored in the auxiliary storage device, and the CPU of the computer system reads the control program from the auxiliary storage device, thereby allowing the host system 12 to perform the control process.

Figure 3:
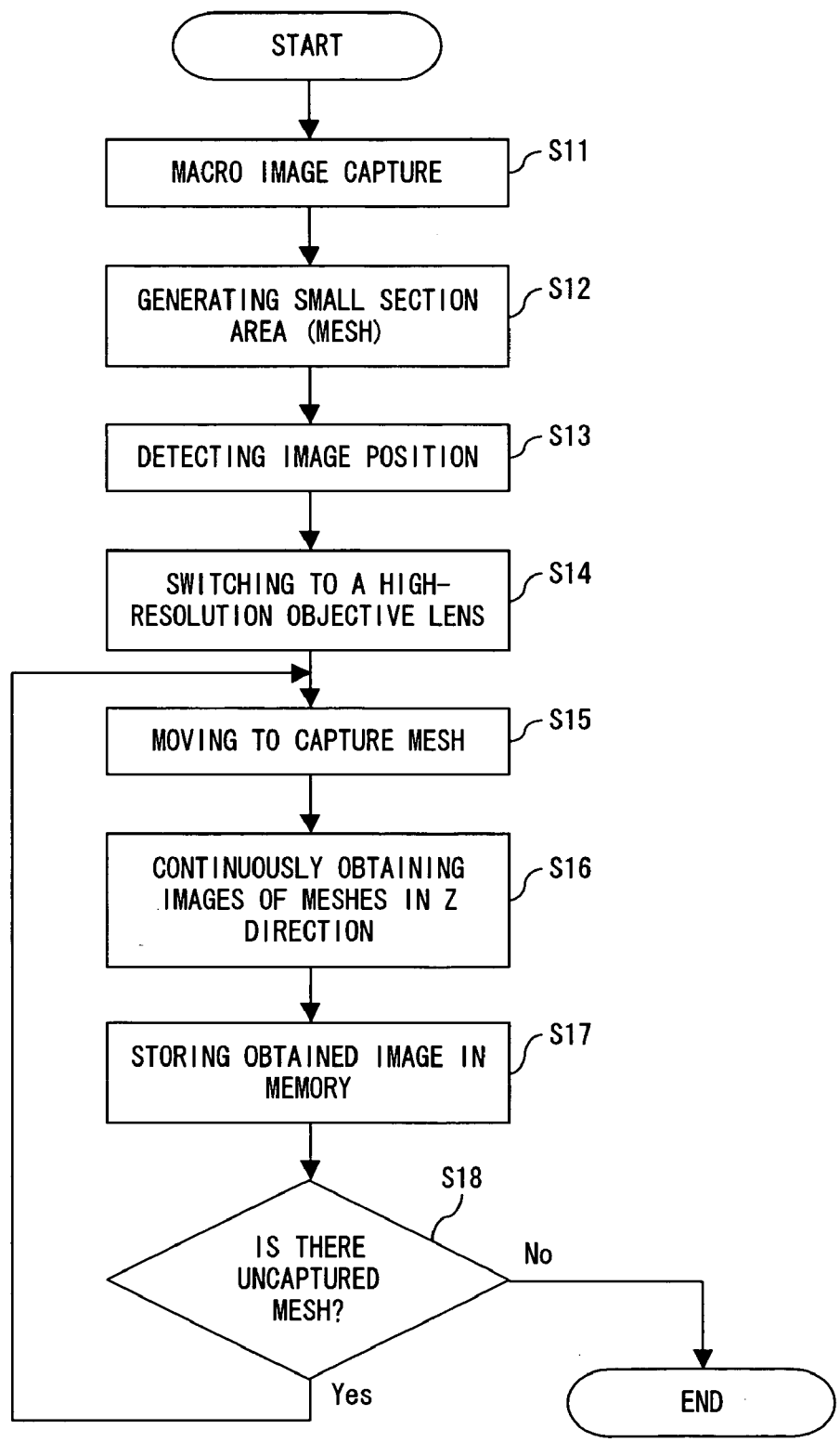
FIG. 3 is a flowchart showing the contents of the image obtaining process.

First, the image obtaining process of allowing the microscope system shown in FIG. 2 to perform the operation of obtaining and storing the observation object image of the sample 2 to be observed is explained below. FIG. 3 is a flowchart showing the process contents of the image obtaining process.

When an instruction of start the process is issued from an operator of the image obtaining process to the host system 12, and the image obtaining process is started, the revolver 7 is controlled and the objective lens 8 is switched to a low magnification lens, the TV camera 11 is controlled to perform macro image capture, and the entire image of the observation object is captured (S11). When the macro image capture is completed, a captured macro image passes through the video board 16, and captured by the host system 12 as macro image data.

Then, as shown in FIG. 4, the process of generating an L rows by N columns of mesh on an obtained macro image is performed (S12). Each mesh generated in the process corresponds to the vision (angle of view) area of a high-resolution objective lens.

Then, the presence/absence of an image of an observation object in each mesh area in the generated 1×n meshes is detected, a portion containing an observation object image is extracted, and a process of assigning a mesh number indicating the capture order to each of the extracted meshes is performed (S13). The detection of the presence/absence of an image of an observation object can be performed based on the abrupt change of the contrast or the color determined by calculating the difference in brightness between adjacent pixels in an image.

Then, the revolver 7 is controlled and the process of switching the objective lens 8 into a high-resolution lens is performed (S14).

Next, a control instruction is issued to the stage X-Y drive control unit 14, and the process of traveling the stage 1 in the XY direction is performed such that the portion of the sample 2 corresponding to the portion assigned the mesh number for the first capture in the meshes can be immediately below the objective lens 8 (S15).

When the portion of the sample 2 corresponding to the mesh to be captured is located immediately below the objective lens 8, a control instruction is issued to the stage Z drive control unit 15 to traverse the stage 1 in the Z direction, and the TV camera 11 is controlled and the Z direction image of the observation object is continuously captured (S16). A plurality of Z direction images obtained as a result of the process pass through the video board 16 and are transmitted to the host system 12 as Z direction image data. The host system 12 stores the received Z direction image data in the image memory (S17).

The details of the Z direction image obtaining process in S16 and S17 are described later.

Then, it is determined whether or not mesh numbers are assigned, but there is a mesh for which a corresponding portion on the sample 2 has not been captured (S18). If there is such a mesh remaining (YES as a result of the determination in the S18), then the processes in S15 to S17 are performed on the mesh. If there is no such mesh (NO as a result of the determination in S18), then the image obtaining process terminates.

The process described above is the image obtaining process. In this process, if a high-resolution image is required, it is desired that the FS 5 and the AS 6 are set in the optimum status. Additionally, since the AS 6 is reduced, the depth of focus is changed. Therefore, the corresponding Z drive is to be performed.

Figure 5:
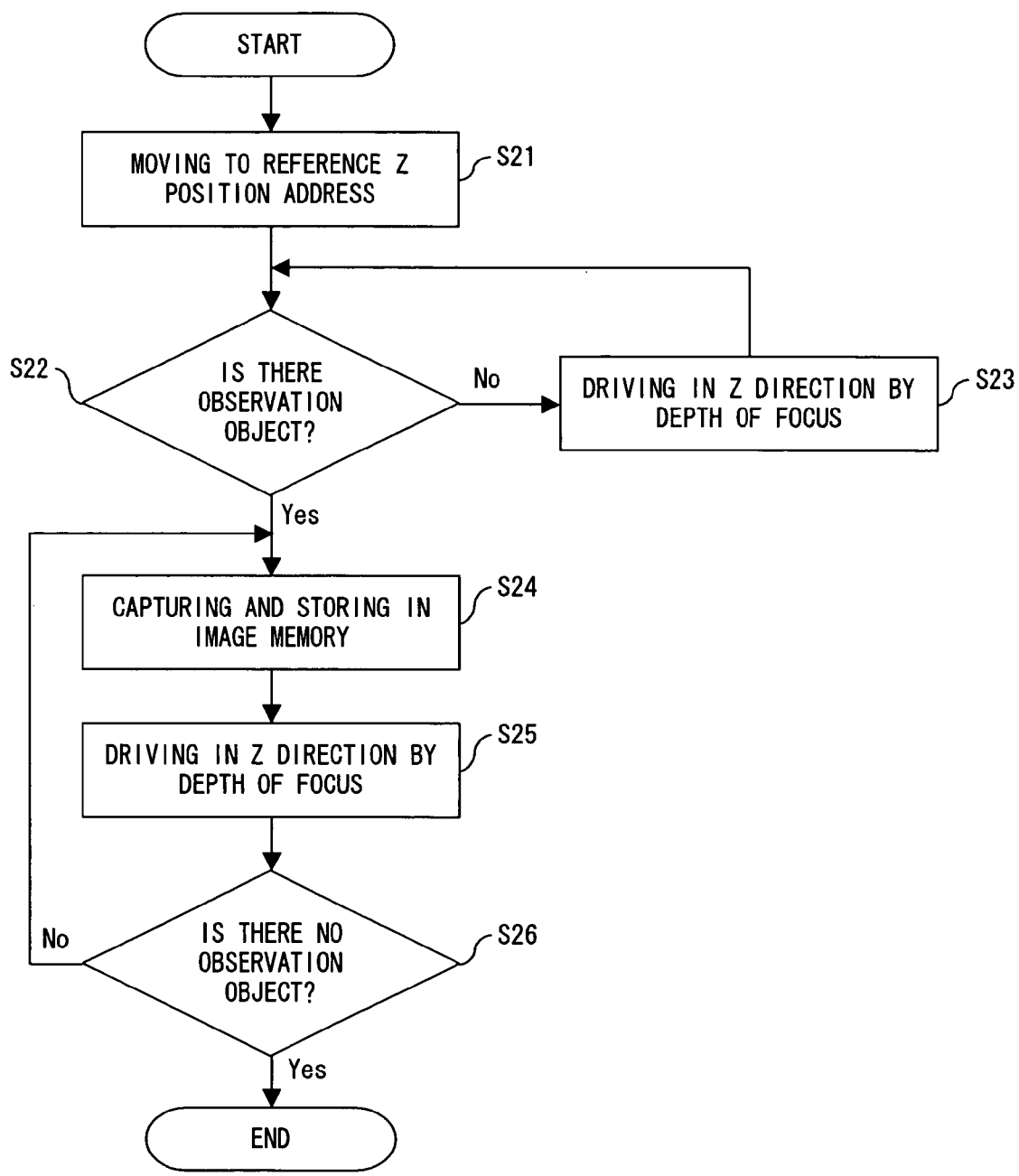
FIG. 5 is a flowchart showing the contents of the Z direction image obtaining process.

The details of the Z direction image obtaining process in S16 and S17 in the above-mentioned image obtaining process are explained below by referring to the flowchart shown in FIG. 5.

When the portion of the sample 2 corresponding to the mesh to be captured is located immediately below the objective lens 8, a control instruction is issued to the stage Z drive control unit 15, the stage 1 is driven in the Z direction, and the sample 2 is moved to the upper limit reference position of the observation object set in advance as the upper limit in the Z direction for the position of the sample 2 (S21).

Then, when the sample 2 is located in the above-mentioned position, the TV camera 11 is controlled, and the portion corresponding to the sample 2 is captured, the captured image is obtained in the host system 12 through the video board 16, and it is determined whether or not the captured image contains an observation object image (S22). The determination can be made based on the abrupt change of the contrast or the color as in the method of detecting the presence/absence of the observation object image used in the process in S4 in the above-mentioned image obtaining process.

As a result, when it is determined that the captured image does not contain an observation object image (NO as a result of the determination in S22), a control instruction is issued to the stage Z drive control unit 15, and the stage 1 is lowered in the Z direction by the depth of focus of the objective lens 8 currently being used in the optical path (S23). Then, the process in S22 is repeated in this position.

Thus, until the observation object image is confirmed in the captured image, the processes in S22 and S23 is repeated.

When the observation object image is confirmed (YES as a result of the determination in S22), the image data representing the image is stored in the image memory (S24).

Then, as in the process in S23, a control instruction is issued to the stage Z drive control unit 15, and the stage 1 is lowered in the Z direction by the depth of focus of the objective lens 8 currently being used in the optical path (S25).

Then, as in the above-mentioned process in S22, when the sample 2 is located in the above-mentioned position, the TV camera 11 is controlled, and the portion corresponding to the sample 2 is captured, the captured image is obtained in the host system 12 through the video board 16, and it is determined whether or not the captured image contains an observation object image (S26).

When it is determined that the captured image still contains an observation object image (NO as a result of the determination in S26), the processes in S24 and S25 are repeated, and the process of capturing corresponding portion of the sample 2 in the position and the process of storing image data obtained in the capture are performed.

If it is determined that an observation object image is not contained in the captured image (YES as a result of the determination in S26), the Z direction image obtaining process terminates, and control is returned to the original image obtaining process.

Described above is the Z direction image obtaining process.

The observation object image captured by the process by the host system 12 shown in FIG. 2 is stored in the image memory of the host system 12 as partial image (meshes 111 through lnm) of the observation object shifted in the Z direction by depth of focus of the used objective lens for each mesh containing an observation object image as shown in FIG. 6.

Then, the control process for coupling images for a virtual observation is explained by referring to FIGS. 7A and 7B shown as the flowcharts of the process contents of the virtual image generating process.

In the present embodiment, from a plurality of partial images of an observation object obtained for each mesh, a partial image in the in-focus state for the entire object in the position of the observation object corresponding to the mesh and in a different position in the Z direction is generated for each mesh, and the generated partial images are combined and display an observation object represented as a two-dimensional image.

A method of obtaining a partial image (focused partial image) in the in-focus state for the entire object different in position in the Z direction from a plurality of partial images of an observation object corresponding to each mesh is based on the technology (for example, the technology disclosed in the above-mentioned Japanese Patent Publication No. 3191928) of performing the recovery process using a spatial frequency filter referred to as a recovery filter on the summed image obtained by adding a plurality of images containing a portion in the in-focus state in the positions different in the optical axis direction, and can be the technology of obtaining an image having a long depth of focus under a changed optical condition such as the numerical aperture of the output of the image forming optical system, the wavelength of a pickup element, etc., that is, for example, the technology disclosed in Japanese Patent Application Laid-open No. Hei 9-298682 (U.S. Pat. No. 5,933,513 Specifications).

In the flowcharts shown in FIGS. 7A and 7B, FIG. 7A shows the process of performing a low-magnification observation, and FIG. 7B shows the process of performing a high-magnification observation.

The process of performing a virtual observation under low magnification shown in FIG. 7A is explained below.

This process is started when an instruction to start an observation issued by an observer is received by the host system 12.

First, the process of accumulating the partial images of an observation object in pixel unit for each mesh (S31) and the arithmetic process for applying a recovery filter to accumulated image obtained in the accumulating process (S32) are performed. These processes are performed to use the above-mentioned technology, and the processes generate in the host system 12 a partial image in the in-focus state for the entire object in different positions in the Z direction of the observation object corresponding to the mesh. After the partial images in the in-focus state for the object in the positions different in the Z direction are generated for the entire mesh, the partial images corresponding to the adjacent meshes are combined (S33). The image of the entire observation object combined in the process is an image without the lack of information caused by the short depth of focus of the objective lens 8.

Then, the image of the observation object obtained as described above is reduced depending on the magnification indicated by an instruction of an operator, and displayed on the display unit of the host system 12 not shown in the attached drawings, thereby terminating a series of the processes.

Described below is the process of a virtual observation under high magnification shown in FIG. 7B.

This process is started when the instruction to start the observation by an observer is received by the host system 12.

First, the center of a specific mesh in the defined meshes, for example, a mesh corresponding to the central position of the portion to be observed in the observation object, is assigned a reference Z position address (S41).

Then, the process of extracting the partial image which is assigned the address indicating the Z position of the a capture image closest to the reference Z position address in a plurality of partial images obtained in the mesh in which a reference Z position address and a mesh adjacent to the mesh is performed (S42), and the process of generating a partial combined image of the observation object at the reference Z position address by combining the extracted partial images is performed (S43).

Then, based on the partial combined image of the observation object generated in process in the preceding step, the process of generating a partial combined image of an observation object in each layer corresponding to the address value indicating the Z position above and below is performed (S44).

Then, in the partial combined image of the observation object in each layer corresponding to the address value indicating the Z position obtained as described above, a partial combined image corresponding to the Z position relating to the instruction from the observer, which is input via a layer selection unit 19, is extracted and displayed on the display unit (not shown in the attached drawings) of the host system 12, thereby terminating the series of the processes.

The processes of generating a virtual image in FIGS. 7A and 7B are explained below by referring to FIGS. 8A and 8B.

Figure 8A:
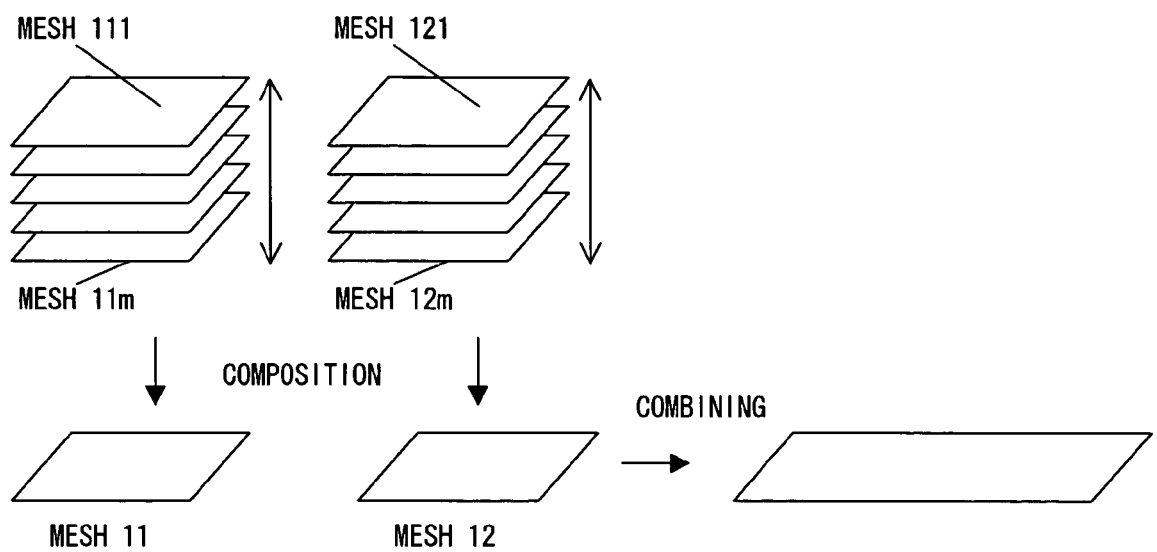
FIG. 8A shows the state in which a virtual image is generated in the process shown in FIG. 7A.

FIG. 8A shows the process of constructing a virtual image under low magnification. A partial image obtained by applying a recovery filter after accumulating each Z direction image of each mesh is combined with another partial image between adjacent meshes. Thus, a virtual image of the entire observation object is generated.

Figure 8B:
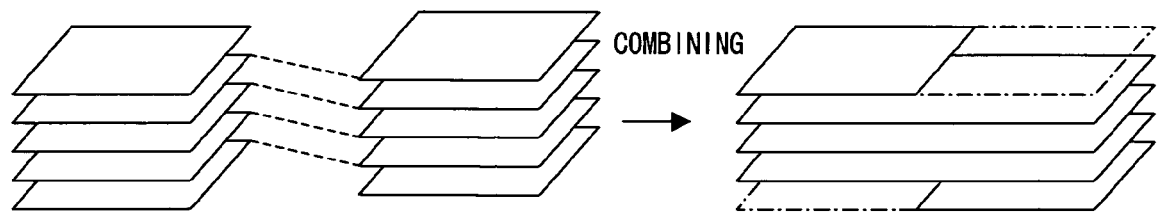
FIG. 8B shows the state in which a virtual image is generated in the process shown in FIG. 7B.

FIG. 8B shows the process of constructing a virtual image under high magnification. In a plurality of partial images obtained for each mesh, the images having the closest Z position addresses after the capture are combined between adjacent meshes, thereby generating a virtual image which is a partial combined image of the observation object depending on the Z position.

As shown by the alternate long and short dashed lines in FIG. 8B, when the images having the close Z position addresses in the capture are not obtained between adjacent meshes, a virtual image having a blank portion is generated.

As described above, in the microscope system according to the present embodiment, that is, a virtual microscope system, an image of an observation object is reconstructed by combining partial images captured in advance, and the lack of information in an obtained observation object image can be avoided. Therefore, the observation precision in the virtual image observation can be remarkably improved.

In the microscope system according to the present embodiment, the position control in the X, Y, and Z directions is performed by driving the stage 1, but a similar effect can be obtained by performing the control by driving the objective lens 8.

In reconstructing an observation object image under low magnification according to the present embodiment, a partial image in the in-focus state for the entire object different in the positions in the Z direction in the positions of the observation object corresponding to the mesh has been generated using a recovery filter on the accumulated image. The lack of information in the obtained observation object image can also be avoided by the method of extracting and combining images in the in-focus state from a plurality of partial images as in the technology disclosed in, for example, the above-mentioned Japanese Patent Application Laid-open No. Hei 5-333271.

Furthermore, in constructing an image under low magnification, an image obtained in a well-known confocal observation in which the depth of focus is very short can be simply accumulated.

In the present embodiment, a large volume of virtual images are generated to cover the entire sample 2. However, to reduce the amount of the virtual images and decrease the process of generating images, virtual images can be generated for a partial areas of the sample 2 indicated by the operator. To attain this, the process contents can be processed in steps S19 and S20 shown in FIG. 9 instead of the processes S12 and S13 in the image obtaining process shown in FIG. 3.

In S19, the macro image (entire image of an observation object) obtained in the process in S11 is displayed on the display unit (not shown in the attached drawings) of the host system 12, and the process of obtaining an instruction in the range (range in the XY direction and range in the Z direction) of an area in which a virtual image is generated is performed by the operator on the macro image. The operator performs this instruction by operating the host system 12.

In the process in S20, in the area related to the instruction in the macro image, the meshes of the number indicating the capture order corresponding to the size of the area are generated, and the mesh number is assigned to each of the generated meshes. Then, control is returned to the process in S14 (FIG. 4).

Figure 9:
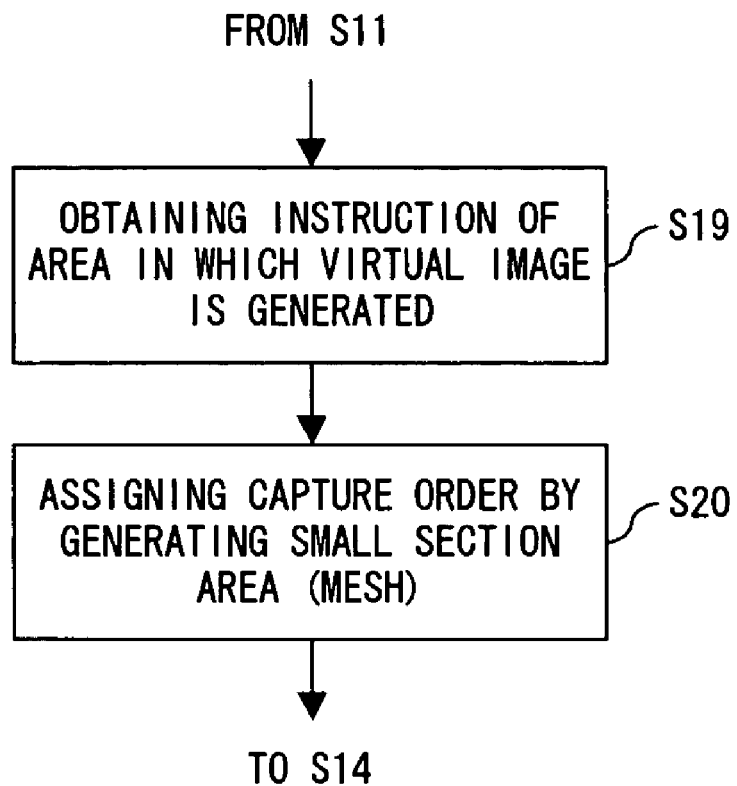
FIG. 9 is a flowchart showing the contents of the process of the first variation of the image obtaining process shown in FIG. 3.

The processes shown in FIGS. 9 and 3 can be replaced with the process shown by the flowchart in FIG. 10, and the continuous obtaining process can be performed on the Z direction images only for the portions of the sample 2 corresponding to the indication by the operator in the extracted meshes to reduce the amount of virtual images and decrease the process of image generation.

Described below is the process shown in FIG. 10. In the process shown in FIG. 10, the process step similar to that in FIG. 3 is assigned the identical reference numeral, and the detailed explanation of the process is omitted here.

In the process in S31 performed after S13, the obtained macro image (entire image of the observation object) and the mesh extracted in the process in S13 are displayed on the display unit (not shown in the attached drawings) of the host system 12, the process of obtaining an instruction to specify the mesh for continuously obtaining a Z direction image to be performed by the operator on the macro image is performed, and then control is passed to step S14.

In the process in S32 performed after S15, the process of determining whether or not the designation of continuously obtaining a Z direction image on the mesh to be currently capture has been performed. If the designation has been performed (YES as a result of the determination), control is passed to step S16, and the Z direction image for the portion of the sample 2 corresponding to the mesh is continuously performed. If the designation has not been performed (NO as a result of the determination), then only one Z direction image with high resolution is obtained in step S32, and control is passed to step S17.

The above-mentioned process in FIG. 10 replaces the process in FIG. 3, thereby reducing the amount of virtual images and decreasing image generation.

Figure 11:
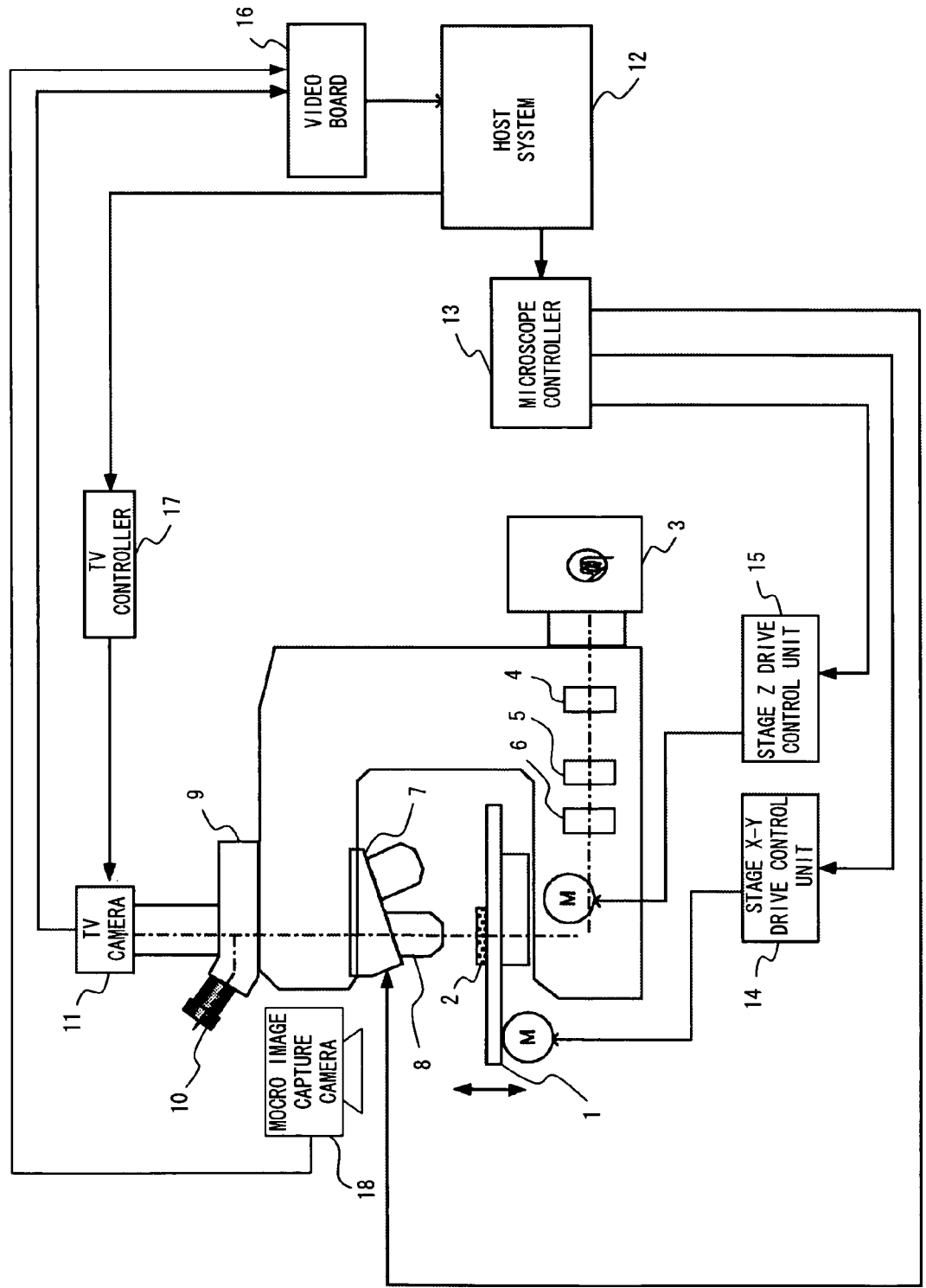
FIG. 11 shows the configuration of the microscope system provided with a macro capture camera.

In the above-mentioned embodiment, an operator indicates an area in which a virtual image is generated on the macro image obtained by capturing the entire image of an observation object using the low magnification objective lens 8 in the process in S11 (FIG. 3). Instead of this, as shown in FIG. 11, a macro capture camera 18 capable of capturing the entire image of an observation object can be added to the microscope system so that the operator can indicate the area in which a virtual image is to be generated for an image obtained by the macro capture camera 18.

Embodiment 2

In the embodiment 2 described below, an observation object image is displayed by the similar operationality in the observation actually using a microscope.

The configuration of the microscope system according to the second embodiment is the same as that in the first embodiment. In the image obtaining process and the virtual image obtaining process performed by the host system 12, the same processes are performed as in the first embodiment, and a virtual image for low-magnification observation and a virtual image for each layer in the Z direction for high-magnification observation are generated.

The following explanation is given by assuming that a virtual image has already been generated and displayed on the display unit (not shown in the attached drawings) of the host system 12 as a result of the above-mentioned virtual image generating process performed by the host system 12.

Figure 12:
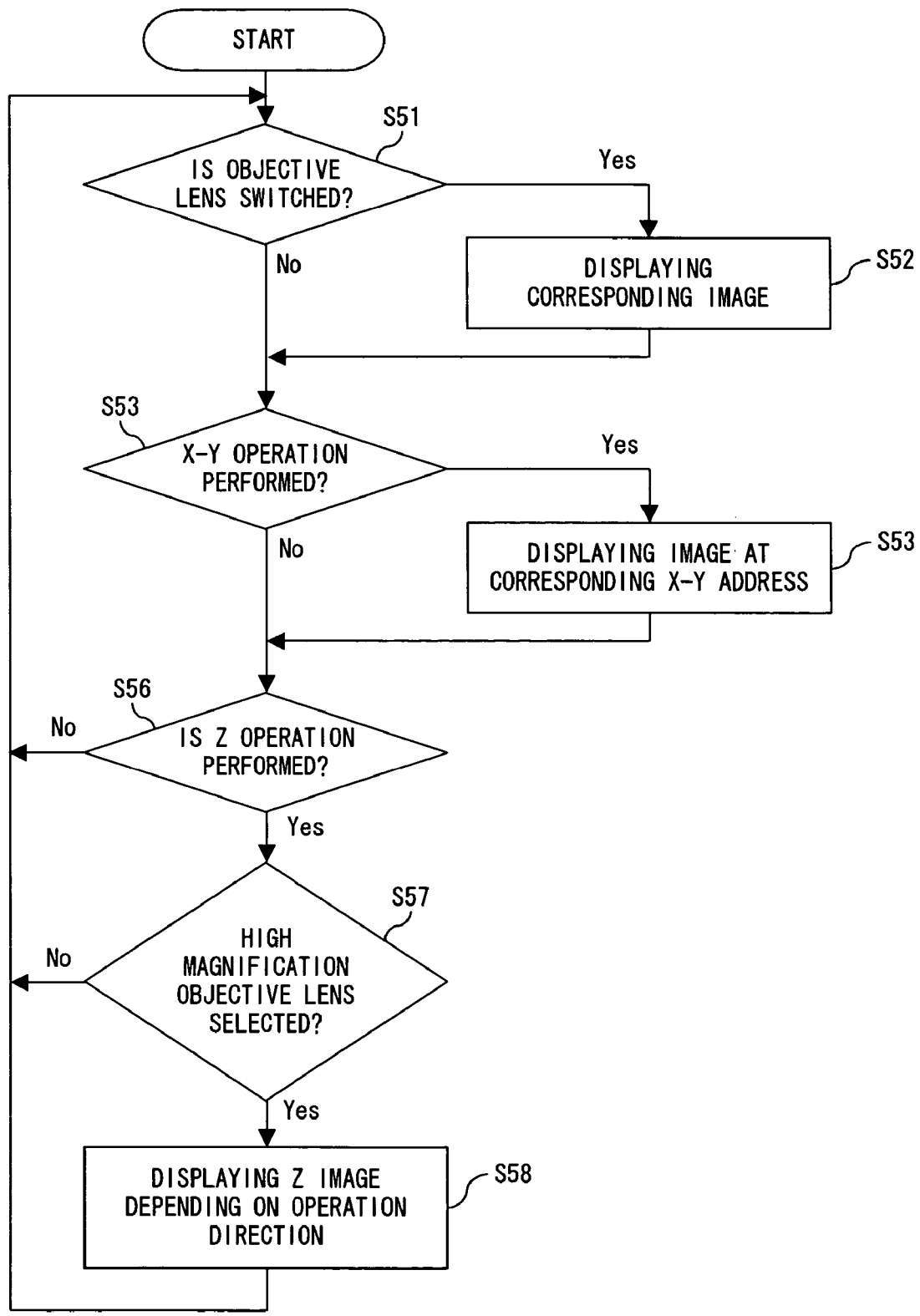
FIG. 12 is a flowchart showing the contents of the virtual image display process.

Described below is the process shown in FIG. 12. FIG. 12 is a flowchart of the process contents of the virtual image display process. In this process, the display of a virtual image on the display unit of the host system 12 is changed depending on the instruction to move the display position and change the display magnification from the observer, and this process is performed by the host system 12 after the virtual image generating process.

When the process is started, the presence/absence of an instruction about the display magnification of an image from the observer to the host system 12, that is, the presence/absence of the instruction about the selection of an objective lens in the optical path is detected (S51).

Only when the instruction is detected (YES as a result of the determination in S51), a virtual image corresponding to the magnification (objective lens) relating to the magnification is displayed (S52).

For example, when an instruction of low magnification is obtained, as shown by (a) in FIG. 13, a partial image generated by 16 (4×4) meshes in the virtual images for low-magnification observation is extracted, the central portion of the extracted partial image is circularly cut out, and is displayed on the display unit as if a real object were being observed using the microscope. When an instruction of high magnification is obtained, as shown by (b) in FIG. 13, the partial image corresponding to one mesh and located in a predetermined Z position is extracted, and in the extracted partial images the central portion is similarly and circularly cut out and displayed on the display unit. At this time, the cut-out shape is not limited to a circle.

In the instruction about the movement of the display position of an image from the observer to the host system 12, the presence/absence of an instruction to move in the XY direction is detected (S53).

Only when the instruction is detected (YES as a result of the determination in S53), the image displayed on the display unit is changed into the image corresponding to the position after the movement based on the instruction (S54).

For example, in the low-magnification observation indicated by (a) shown in FIG. 13, the display position is moved by 1 mesh in the X direction (for 1 mesh which is ¼ of the vision having 4 meshes in the X direction) by obtaining an instruction to displace the display by ¼ in the vision in the X direction. In the high-magnification observation indicated by (b) shown in FIG. 13, the display position is moved by 1 mesh in the X direction (one mesh which is the vision for the vision having one mesh in the X direction) by obtaining an instruction to displace the display by the vision in the X direction.

In the instructions relating to the movement of the display position of an image from the observer to the host system 12, the presence/absence of the instruction relating to the movement in the Z direction is detected (S56). If the instruction is not detected (NO as a result of the determination in S56), control is returned to step S51, and the above-mentioned process is repeated.

When the instruction is detected (YES as a result of the determination S56), the observer determines whether or not the operating system currently being selected is a high magnification lens (S57). Only when a high magnification objective lens is selected (YES as a result of the determination), the partial image being displayed on the display unit is changed into a partial image corresponding to the Z position after the movement at the instruction detected in S56 (S58). On the other hand, when a high magnification objective lens is not selected (NO as a result of the determination), the display is not specifically changed.

After the above-mentioned processes, control is returned to step S51, and the above-mentioned process is repeated.

Described above is the virtual image display process.

Thus, in the microscope system according to the present embodiment, an observer can have the feeling that an observation object is actually been observed by changing the display area of a virtual image and the layer of the virtual image in the Z direction at an instruction of the observer about the display magnification (selection of objective lens), and an observation object image can be reproduced with high reliability without the lack of image information. That is, by displaying any of the images for each layer in the high-magnification observation in the virtual microscopic observation and changing the image display in a movement instruction relating to the focal position of the objective lens from the observer into a different depth-of-focus position, an observation object image as in the high-magnification observation in the microscopic observation using a real observation object can be displayed.

As described above, in any of the two above-mentioned embodiments, in a reconstructing process of combining partial images captured in advance, that is, in a virtual image microscope system, an observation object image can be provided in the Z position after the movement according to the instruction to move in the Z direction as in observing a real observation object using a microscope.

Figure 14:
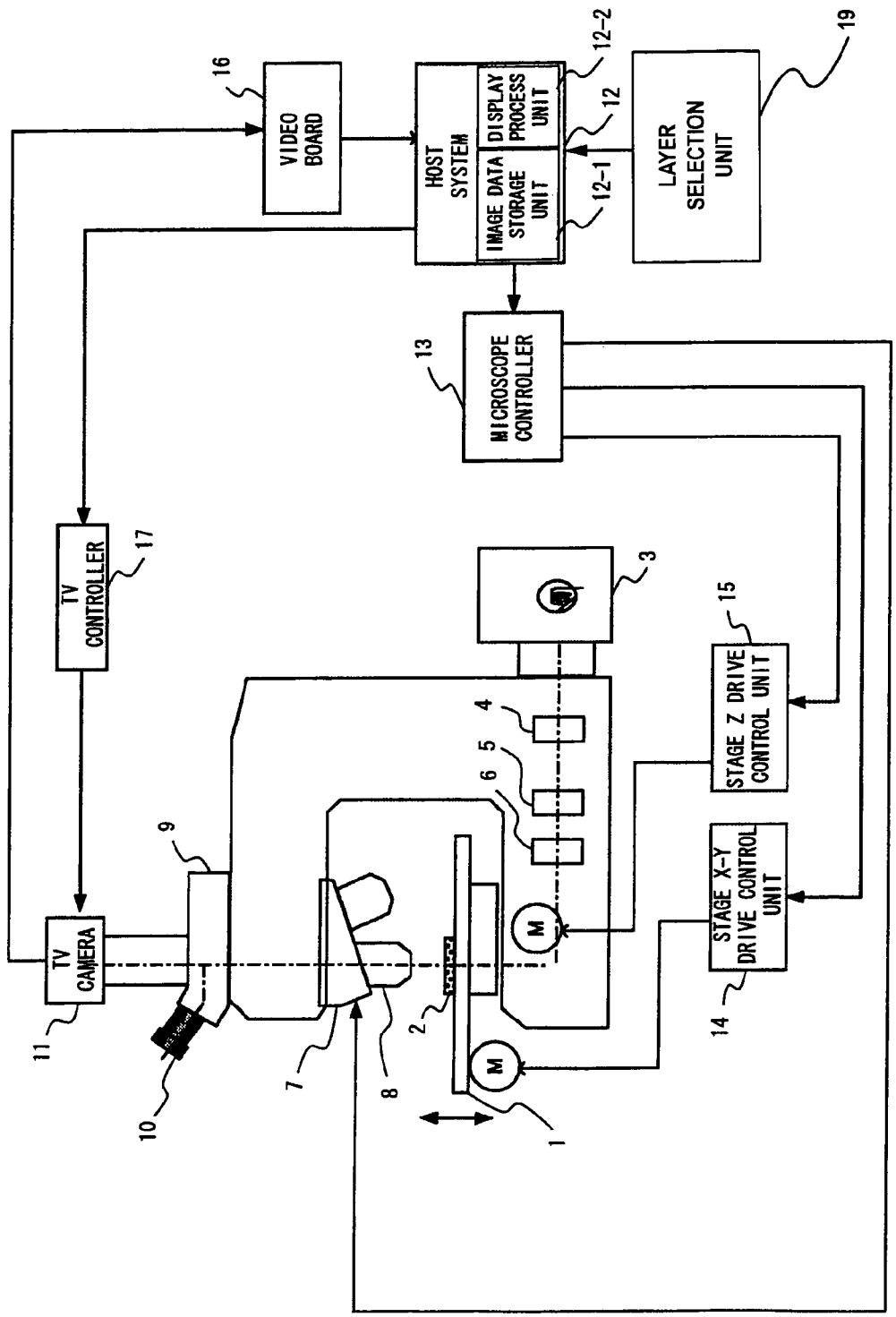
FIG. 14 shows a variation of the microscope system embodying the present invention shown in FIG. 2.

In the above-mentioned explanation, the embodiment 2 is explained by assuming that the virtual image generating process is performed by the host system 12. Instead of this, as shown in FIG. 14, as shown in FIG. 14, an image data storage unit 12-1 and a display process unit 12-2 can be provided for the host system 12, the image data indicating the entire image of an observation object and the partial combined image obtained as a result of the virtual image generating process can be stored in the image data storage unit 12-1 in advance, and the display process unit 12-2 can perform the virtual image display process on the image data, thereby realizing the embodiment 2 without the body of the microscope.

By generating a control program for allowing the CPU of a computer system to perform the process shown in the flowchart in FIGS. 3, 5, 7A, 7B, 9, 10, and 12, storing it in a computer-readable storage medium, and reading the program from the storage medium to the computer system for execution by the CPU, the computer system can function as the host system 12.

FIG. 15 shows an example of a computer-readable storage medium reading a recorded control program. The storage medium can be, for example, a storage device 21 such as ROM, a hard disk device, etc. provided in a computer system 20 or external to it, a portable storage medium 23, etc. such as a flexible disk capable of reading a control program stored by inserting into a medium drive device 22 provided for the computer system 20, MO (magneto-optical disk), CD-ROM, DVD-ROM, etc.

The storage medium can be a storage device 26 provided for a computer system functioning as a program server 25 connected to the computer system 20 through a communications circuit 24. In this case, a transmission signal obtained by modulating a carrier wave using a data signal representing a control program can be transmitted to the computer system 20 through the communications circuit 24 from the program server 25, and a control program can be regenerated, thereby executing the control program by the CPU of the computer system 20.

Furthermore, the image data representing the entire image of an observation object and the partial combined image generated by the computer system 20 can be distributed through other computer system 27-1, 27-2, . . . through the communications circuit 24 so that the virtual image display process can be performed by the computer system 27-1, 27-2, . . . . Thus, a virtual microscopic observation on the same observation object can be performed by a plurality of observers, and the computer system 27-1, 27-2, . . . provided in a remote places can perform a virtual image microscopic observation from the computer system 20.

The present invention can be reformed and changed within a scope of the gist of the present invention so far as an image in the depth of focus (Z) direction of an observation object is obtained by a high-resolution lens and a low-magnification observation image of an observation object is constructed.

For example, in the above-mentioned explanation, in reconstructing a virtual image in each layer in the Z direction, partial images are combined between adjacent meshes based on the address of the Z position when an image is obtained. Instead of this, a partial image can be determined between adjacent meshes by combining into the partial image according to the image information obtained from a partial image. Thus, when an observation object image is obtained, although a slide and a stage is inclined in the Z direction, the influence of the inclination can be amended in displaying the virtual image.

Furthermore, in the present invention, the range of the image obtaining area in the Z direction of the observation object can be determined using a preset data, which can be replaced with a well-known autofocus function to detect the image position of an observation object. Thus, the time taken for obtaining an image can be shortened.

What is claimed is:

1. A microscope system, comprising:
a macro image capture unit which captures a macro image of an observation object;
a definition unit which defines, after the macro image is captured, a plurality of partial areas such that the plurality of partial areas covers the captured macro image;
a partial image capture unit which captures a plurality of partial images of the observation object in each of the partial areas, such that in each of the partial areas said partial images are: (i) stacked in a direction along an axis of an objective lens used in capturing the partial images, with a pitch substantially equivalent to a specific depth of focus of the objective lens used in capturing the partial images, and (ii) at same x- and y-coordinates in focal planes perpendicular to the axis of the objective lens;
a storage unit which stores the macro image and the plurality of partial images;
a focused partial image generation unit which generates a properly focused partial image in each of the partial areas by accumulating respective partial images in the stack corresponding to the partial area and applying a recovery process to each of the accumulated images utilizing a spatial frequency filtering such that the properly focused partial image is in an in-focus state at every position therein along the direction along the axis of the objective lens; and
a focused image generation unit which generates a single properly focused whole image of the observation object by combining the properly focused partial images which are generated respectively for the partial areas from the respective partial images in the stack corresponding to the partial area, each of said partial images in the stack corresponding to one partial area being at same x- and y-coordinates in focal planes perpendicular to the axis of the objective lens;
wherein the properly focused whole image is displayed in response to receiving an instruction for a low magnification rate observation and the displayed properly focused whole image is reduced by a rate corresponding to a magnification rate specified by the instruction.

2. The system according to claim 1, wherein the partial image capture unit captures the partial images by confocal observation.

3. The system according to claim 1, further comprising an area designation obtaining unit, which obtains an instruction designating an area of the observation object;
wherein an area of the obtained macro image covered by the partial areas defined by the definition unit is limited to the area designated by the instruction.

4. The system according to claim 1, wherein, in response to receiving an instruction for a high magnification rate observation, among the partial images captured by the partial image capture unit, partial images captured at a same position in the direction along the axis of the objective lens are combined and displayed.

5. A microscope system, comprising:
macro image capturing means for capturing a macro image of an observation object;
definition means for defining, after the macro image is captured, a plurality of partial areas such that the plurality of partial areas covers the captured macro image;
partial image capturing means for capturing a plurality of partial images of the observation object in each of the partial areas, such that in each of the partial areas said partial images are: (i) stacked in a direction along an axis of an objective lens used in capturing the partial images, with a pitch substantially equivalent to a specific depth of focus of the objective lens used in capturing the partial images, and (ii) at same x- and y-coordinates in focal planes perpendicular to the axis of the objective lens;
storage means for storing the macro image and the plurality of partial images;
focused partial image generation means for generating a properly focused partial image in each of the partial areas by accumulating respective partial images in the stack corresponding to the partial area and applying a recovery process to each of the accumulated images utilizing a spatial frequency filtering such that the properly focused partial image is in an in-focus state at every position therein along the direction along the axis of the objective lens; and
focused image generation means for generating a single properly focused whole image of the observation object by combining the properly focused partial images which are generated respectively for the partial areas from the respective partial images in the stack corresponding to the partial area, each of said partial images in the stack corresponding to one partial area being at same x- and y-coordinates in focal planes perpendicular to the axis of the objective lens;

wherein the properly focused whole image is displayed in response to receiving an instruction for a low magnification rate observation and the displayed properly focused whole image is reduced by a rate corresponding to a magnification rate specified by the instruction.

6. The system according to claim 5, wherein the partial image capturing means captures the partial images by confocal observation.

7. The system according to claim 5, wherein, in response to receiving an instruction for a high magnification rate observation, among the partial images captured by the partial image capturing means, partial images captured at a same position in the direction along the axis of the objective lens are combined and displayed.

8. A method for displaying images of an observation object obtained using a microscope system, said method comprising:

capturing a macro image of an observation object;

defining, after the macro image is captured, a plurality of partial areas such that the plurality of partial areas covers the captured macro image;

capturing a plurality of partial images of the observation object in each of the partial areas, such that in each of the partial areas said partial images are: (i) stacked in a direction along an axis of an objective lens used in capturing the partial images, with a pitch substantially equivalent to a specific depth of focus of the objective lens used in capturing the partial images, and (ii) at same x- and y-coordinates in focal planes perpendicular to the axis of the objective lens;

storing the macro image and the plurality of partial images;

generating a properly focused partial image in each of the partial areas by accumulating respective partial images in the stack corresponding to the partial area and applying a recovery process to each of the accumulated images utilizing a spatial frequency filtering such that the properly focused partial image is in an in-focus state at every position therein along the direction along the axis of the objective lens;

generating a single properly focused whole image of the observation object by combining the properly focused partial images which are generated respectively for the partial areas from the respective partial images in the stack corresponding to the partial area, each of said partial images in the stack corresponding to one partial area being at same x- and y-coordinates in focal planes perpendicular to the axis of the objective lens;

receiving an instruction for a low magnification rate observation;

reducing the properly focused whole image by a rate corresponding to a magnification rate specified by the instruction; and displaying the reduced properly focused whole image.

9. The method according to claim 8, wherein the partial images are captured by confocal observation.

10. The method according to claim 8, further comprising obtaining an instruction designating an area of the observation object;

wherein an area of the obtained macro image covered by the defined partial areas is limited to the area designated by the instruction.

11. The method according to claim 8, further comprising:
receiving an instruction for a high magnification rate observation;

combining, from among the captured partial images, partial images captured at a same position in the direction along the axis of the objective lens, in response to receiving the instruction for the high magnification rate observation; and displaying the combined partial images.

12. A storage medium readable by a computer apparatus and having a program stored thereon for use with a microscope system, said program being executable by the computer apparatus to cause the computer apparatus to perform:

a macro image capturing process of capturing a macro image of an observation object;

a defining process of defining, after the macro image is captured, a plurality of partial areas such that the plurality of partial areas covers the captured macro image;

a partial image capturing process of capturing a plurality of partial images of the observation object in each of the partial areas, such that in each of the partial areas said partial images are: (i) stacked in a direction along an axis of an objective lens used in capturing the partial images, with a pitch substantially equivalent to a specific depth of focus of the objective lens used in capturing the partial images, and (ii) at same x- and y-coordinates in focal planes perpendicular to the axis of the objective lens;

a focused partial image generating process of generating a properly focused partial image in each of the partial areas by accumulating respective partial images in the stack corresponding to the partial area and applying a recovery process to each of the accumulated images utilizing a spatial frequency filtering such that the properly focused partial image is in an in-focus state at every position therein along the direction along the axis of the objective lens;

a focused image generating process of generating a single properly focused whole image of the observation object by combining the properly focused partial images which are generated respectively for the partial areas from the respective partial images in the stack corresponding to the partial area, each of said partial images in the stack corresponding to one partial area being at same x- and y-coordinates in focal planes perpendicular to the axis of the objective lens;

an instruction receiving process of receiving an instruction for a low magnification rate observation;

a reducing process of reducing the properly focused whole image by a rate corresponding to a magnification rate specified by the instruction; and a display process of displaying the reduced properly focused whole image.

13. The storage medium according to claim 12, wherein the program is executable by the computer apparatus to cause the computer apparatus to perform further processes comprising:

a second instruction receiving process of receiving an instruction for a high magnification rate observation;

a combining process of combining, from among the captured partial images, partial images captured at a same position in the direction along the axis of the objective lens, in response to receiving the instruction for the high magnification rate observation; and a second display process of displaying the combined partial images.

14. A microscope system comprising:
a macro image capture unit which captures a macro image of an observation object;

a definition unit which defines, after the macro image is captured, a plurality of partial areas such that the plurality of partial areas covers the captured macro image;

a partial image capture unit which captures a plurality of partial images of the observation object in each of the partial areas, such that in each of the partial areas said partial images are: (i) stacked in a direction along an axis of an objective lens used in capturing the partial images, with a pitch substantially equivalent to a specific depth of focus of the objective lens used in capturing the partial images, and (ii) at same x- and y-coordinates in focal planes perpendicular to the axis of the objective lens;

a storage unit which stores the macro image and the plurality of partial images;

a focused partial image generation unit which generates a properly focused partial image in each of the partial areas by accumulating respective partial images in the stack corresponding to the partial area and applying a recovery process to each of the accumulated images utilizing a spatial frequency filtering such that the properly focused partial image is in an in-focus state at every position therein along the direction along the axis of the objective lens; and a focused image reconstruction unit which reconstructs a single focused image of at least a part of the observation object having a higher magnification than the macro image, by combining at least a plurality of the properly focused partial images which are generated respectively for the partial areas from the respective partial images in the stack corresponding to the partial area, each of said partial images in the stack corresponding to one partial area being at same x- and y-coordinates in focal planes perpendicular to the axis of the objective lens.

15. The system according to claim 14, wherein when at least one of the properly focused partial images required to reconstruct the focused image is not generated by the focused partial image generation unit due partial images not being captured by the partial image capture unit, the focused image reconstruction unit reconstructs the focused image by generating a blank image in place of the at least one properly focused partial image that is not generated by the focused partial image generation unit.

16. The system according to claim 14, wherein the focused image reconstruction unit reconstructs the focused image only for at least one area corresponding to at least one designated part of the observation object.

* * * * *